United States Patent [19]
Grossman

[11] 3,762,373
[45] Oct. 2, 1973

[54] ANIMAL FEEDER
[76] Inventor: Gary S. Grossman, 22 Buckley St., Quincy, Mass. 02169
[22] Filed: Feb. 14, 1972
[21] Appl. No.: 226,092

[52] U.S. Cl.............................. 119/51.11, 119/56
[51] Int. Cl............................................ A01k 05/02
[58] Field of Search................... 119/51.11, 51.13, 119/56; 222/504, 70

[56] References Cited
UNITED STATES PATENTS
| | | | |
|---|---|---|---|
| 3,031,109 | 4/1962 | Krag........................ | 119/51.11 UX |
| 3,115,866 | 12/1963 | Lawson, Jr..................... | 119/56 R |
| 3,196,835 | 7/1965 | Bergerin....................... | 119/51.11 |
| 2,858,799 | 11/1958 | Krauss et al................ | 119/51.11 X |

Primary Examiner—Hugh R. Chamblee
Attorney—Martin Kirkpatrick

[57] ABSTRACT

Apparatus for storing and automatically dispensing food for an animal comprising a hopper for holding the food; a channel communicating with the hopper and having an outlet; a disc-shaped member mounted for rotation with respect to the channel about an axis spaced apart from the channel, the member including an arcuate opening spaced from the axis the same distance as the channel; and means for rotating the member at a predetermined time of day.

9 Claims, 7 Drawing Figures

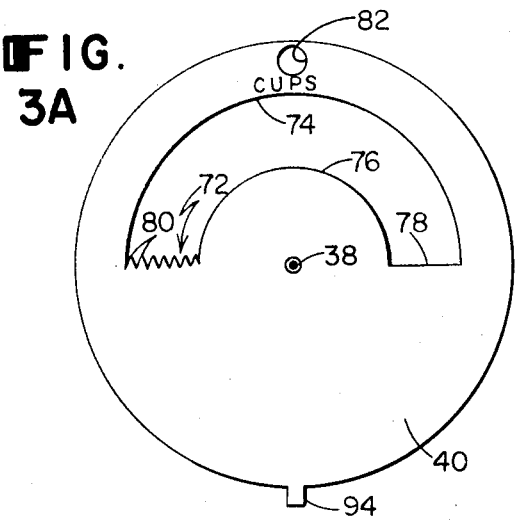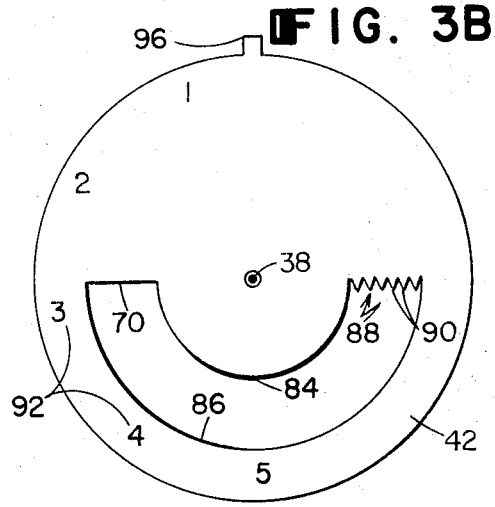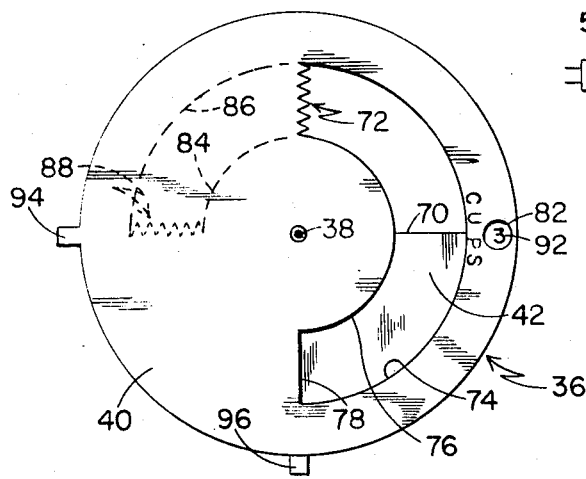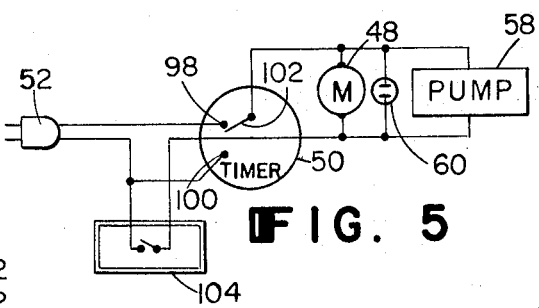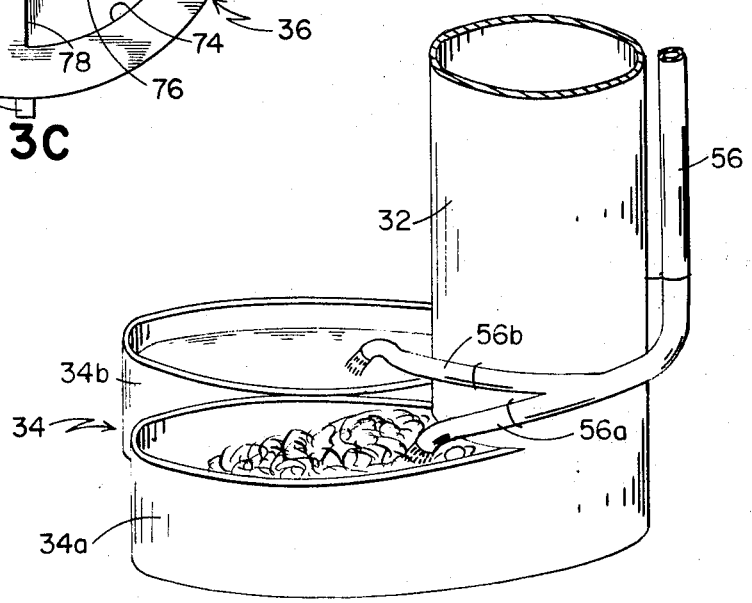

ANIMAL FEEDER

This invention relates to apparatus for the automatic dispensing of animal food.

It is a principal object of the present invention to provide such apparatus which is simple in construction and operation and yet reliable in operation. It is a further object to provide such apparatus which permits the convenient adjustment of both the times at which food is dispensed and the amount of food dispensed at each such time.

To achieve these and other objects as hereinafter appear, apparatus according to the invention includes a hopper for holding the food and a channel communicating with the hopper at one end and having an outlet at the other end. A disc-shaped member is provided between the ends of the channel which is mounted for rotation with respect to the channel and which has an arcuate opening aligned with channel during a portion of the rotation. Means are also provided for rotating the member at a predetermined time of day. In preferred embodiments of the invention the rotatable member comprises a pair of discs each having an arcuate opening. The discs are releasably clamped together for simultaneous rotation with the superposition of those arcuate openings defining an opening in the member formed by the discs. Preferably, the apparatus also includes a plurality of cutting teeth on the trailing edge of the above-mentioned opening and a cleaning brush in contact with the member. The means for rotating the member at a predetermined time of day comprises a motor and a clock-timer which activates the motor at the predetermined time.

In another preferred form, the apparatus includes a water reservoir and a conduit extending from the reservoir and terminating adjacent the outlet of the food channel. A pump or solenoid or mechanical valve is provided in the conduit and is connected to be actuated by the clock-timer at the selectively predetermined time of day.

The above described apparatus may be used with a food receptacle or dish placed directly below the channel and conduit outlets. With this arrangement, a photocell switch or microswitch may be provided in the upper surface of the floor of the receptacle. The switch is interconnected to interrupt the flow of current to the motor and the pump or valve if there is food remaining in the dish (and thereby masking the photocell) at the predetermined time of day.

Other objects, features, and advantages of the invention will appear from the following description of a preferred embodiment taken together with the accompanying drawings. In the drawings:

FIGS. 3A and 3B are plan views of the two discs which form the rotatable member of the apparatus of FIG. 1;

FIG. 3C is a plan view of the discs of FIGS. 3A and 3B in an assembled, face-to-face configuration, illustrating the adjustable opening thereby provided;

FIG. 4 is a perspective view of the food receptacle of the apparatus shown in FIG. 1; and, FIG. 5 is a circuit diagram for the apparatus shown in FIG. 1.

Figure 1:
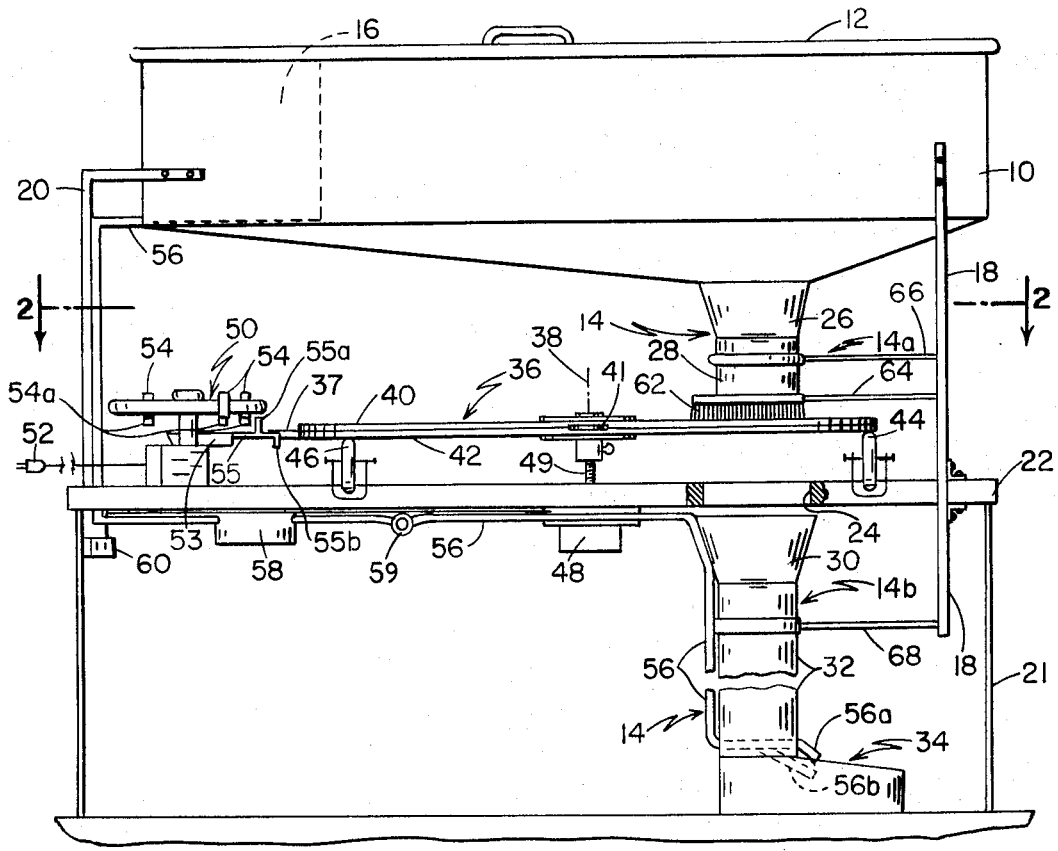
FIG. 1 is a front elevation of apparatus constructed according to the invention.

Referring to the drawings, the apparatus includes a hopper or food reservoir 10 which has a removable cover 12 and which communicates at its lower end with a channel 14. A portion of the reservoir 10 may be segregated as a water storage container 16. Braces 18, 20 support hopper 10 above base 22, itself supported on floor 19 by legs 21. (Alternatively, the apparatus may be wall-mounted and the legs omitted.)

Channel 14 comprises an upper portion 14a above base 22 and a lower portion 14b below base 22. The portions 14a and 14b are vertically aligned with each other and with an opening 24 provided in base 22. The upper portion 14a consists of a funnel section 26 which communicates with the hopper 10 and a pipe section 28. Similarly, the lower channel 14b consists of a funnel section 30 disposed directly below opening 24 in base 22 and a pipe which leads to a food receptacle or dish 34.

A member 36 is mounted for rotation in a plane perpendicular to the axis of channel 14 about an axis 38 which is spaced apart from the channel. The member 36 comprises a pair of discs 40, 42 which are clamped together with rubber grommet 41 therebetween. The discs are supported at their periphery by guide wheels 44 and 46. Motor 48, mounted upon base 22, drives shaft 49 to which member 36 is secured. Finger 37 projects from the periphery of member 36.

Figure 2:
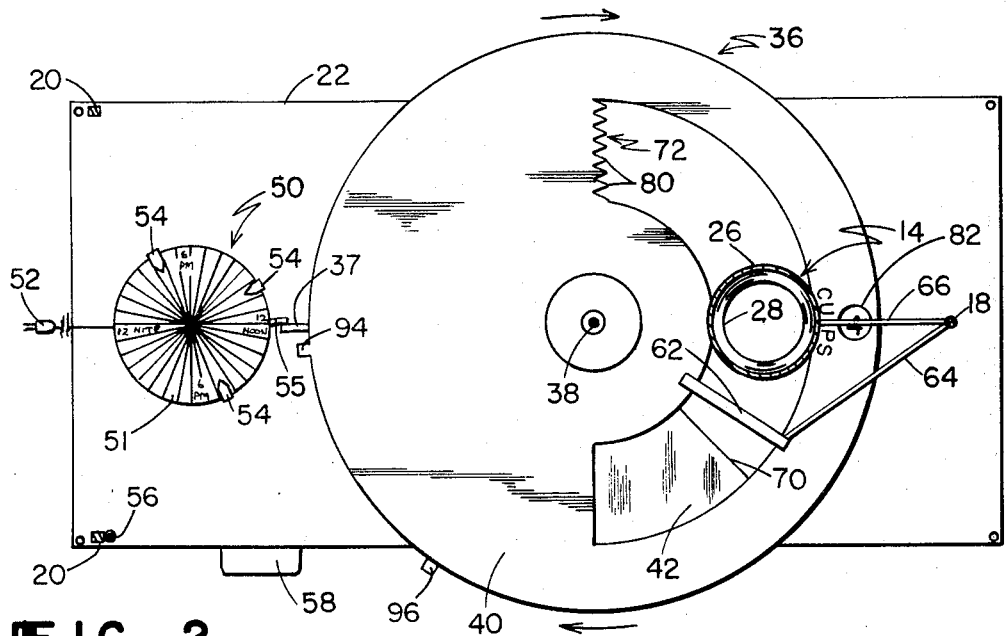
FIG. 2 is a view taken at 2—2 of FIG. 1.

Clock-timer 50 is mounted upon base 22 near the periphery of discs 40, 42. The timer 50 is best seen in FIG. 2 and is preferably a 24 hour unit having a dial 51 divided into 24 hours, the dial is set to the correct time when the timer's plug 52 is connected to a source of 120 volt, 60 cycle AC current. Indicator-switches 54 are provided which may be set at the predetermined times of day when dispensing of food is desired. Each indicator 54 has a downward projection 54a. Switch 53 includes pivoted actuator arm 55 having upward and downward projections 55a and 55b, respectively.

Conduit 56 communicates with water container 16 and extends to the receptacle 34. A pump or valve 58 and an adjustable flow restrictor 59 communicate with conduit 56. The pump 58 is interconnected with timer 50 as described below.

Convenience electrical outlet 60 is mounted upon base 22 and is also interconnected with timer 50. Brush 62 is mounted brace 18 by connecting rod 64 and is disposed adjacent pipe 28 for contact with disc 40. Pipes 28 and 32 are held by support numbers 66 and 68 which are mounted in turn on brace 18.

As best seen in FIG. 2, the rotatable member 36 has an arcuate opening extending from edge 70 of disc 42 circumferentially to toothed edge 72 of disc 40. This arcuate opening is at the same radial distance from axis 38 as the channel 14.

The cooperation of discs 40 and 42 to provide the rotatable member 36 is best seen by referring to FIGS. 3A, 3B, and 3C. The upper disc 40 includes an arcuate opening defined by semicircular edges 74 and 76 and radial edges 72 and 78. Edge 72 includes a plurality of sharpened teeth 80 which project into the opening. Opening 82 is provided on the opposite side of axis 38 from the arcuate opening. The word CUPS appears on the upper surface of disc 40 adjacent the opening 82. Disc 42 has an identically sized and radially located arcuate opening defined by semicircular edges 84 and 96, radial edge 70, and toothed edge 88 having a plurality of teeth 90. A plurality of numbers 92 are provided on the upper surface of disc 42 distributed in a pattern around the center or axis 38 of the disc at a radial distance equal to the distance from axis 38 to opening 82 on disc 40. Discs 40 and 42 are provided with rods 94, 96 respectively, which project from the periphery of the disc.

FIG. 3C illustrates disc 40 overlying disc 42 to provide the rotatable member 36 having an arcuate opening extending from edge 72 to edge 70. With the discs so oriented with respect to each other the number "3" (as at 92) appears centered in the opening 82.

FIG. 4 illustrates the food receptacle 34 which is divided into separate food and water portions 34a and 34b, respectively. The outlet from pipe 32 communicates with receptacle 34a and the water conduit 56 branches to provide separate conduits 56a and 56b which supply water to receptacle 34a and 34b, respectively.

The electrical circuit of the apparatus shown in FIG. 1 is a diagrammatically illustrated in FIG. 5. The leads from plug 52 are connected directly to the timer 50 as at 98 and 100. Motor 48, outlet 60, and pump 58 receive current only when one of the indicator-switches 54 of the timer (indicated diagrammatically as a single switch 102 in FIG. 5) closes the circuit. A conventional photocell switch or microswitch 104 is inserted into the circuit so as to be able to prevent current from reaching motor 48, outlet 60, and pump 58 despite the closing of switch 102. Switch 104 may be mounted in the upper surface of the bottom of food receptacle 34a.

In operation, the discs 40, 42 which form the rotatable member 36 may be rotated with respect to each other by grasping one of rods 94, 96 and exterting force to the other overcoming the friction of grommet 41 and rotating the respective disc. By adjusting the rotational orientation of these discs with respect to each other the size of the opening in member 36 (i.e., the region of overlap of the individual arcuate openings in disc 40 and 42) may be varied. The numbers 92 appearing through opening 82 indicate the quantity of food which will be dispensed with an opening in member 36 of a given size. The appropriate numbers (which represent cups of dry animal food) and their appropriate orientation on the disc 42 are determined experimentally and depend upon the size of channel 14, the speed or rotation of member 36, etc.

With the plug 52 connected to an appropriate source of current, the timer 50 set to indicate the correct time of day, and the indicators 54 set to the hours desired for actuation of the apparatus, the apparatus is ready for automatic operation. When the time arrives that one of the indicators 54 is set for, the appropriate projection 54a pivots actuator 55 by bearing upon projection 55a thus closing switch 53 and supplying current to the motor 48, outlet 60, and pump 58. (Unless, of course, there is still food in the receptacle 34 which prevents light from reaching the conventionally mounted photocell switch 104. In that eventuality, the pump and motor will not be activated and overflow of the receptacle 34 will be avoided.) The pump will distribute water to conduits 56a and 56b and the motor 48 will cause the rotation of member 36. The motor 48 is appropriately geared-down to produce one revolution of member 36 in about 15 seconds. As member 36 rotates the food in hopper 10 and the upper portion 14a of channel 14 will fall through the arcuate opening in member 36 and opening 24 in base 22 into the lower portion 14b of the channel and be delivered to the food receptacle 34a. Finger 37, projecting from the periphery of member 36, is located to strike projection 55b of pivoted actuator 55 so as to open switch 53 after one revolution of the member 36.

As the member 36 rotates the brush 62 provided ahead of the channel 14 in the direction of rotation (clockwise as viewed in FIG. 2) keeps any food falling onto the surface of member 36 adjacent channel 14a and sweeps it into the opening in member 36 as that opening passes under the brush. The teeth 80 at the trailing edge of arcuate opening sever the typically lumpy animal food as they pass beneath the pipe 28.

The pump or solenoid valve 58 is in operation from the time the timer switch is tripped until finger 37 trips the mechanical off switch. Water is supped to receptacles 34a and 34b, as indicated above, at a rate selectable by flow restrictor 59. The water supply to receptacle 34a is for mixing with animal food of the type which requires the addition of water before being offered to the animal. Should a different type of food be used or should the flow of water to receptacle 34a be not desired for other reasons, a cap or clamp may be employed on conduit portion 56a. The outlet 60 may be used to energize a signal (e.g., a bell, a tape recording of the master's voice, etc.) to summon the animal when the food is being dispensed.

While a particular embodiment has been described in detail, other embodiments are within the scope of the invention and the following claims.

What is claimed is:

1. Apparatus for storing and automatically dispensing food for an animal comprising a hopper for holding said food; a channel means continuously communicating with said hopper and having an outlet; a disc-shaped member mounted for rotation with respect to said outlet of said channel means about an axis spaced apart from said channel means, said member including an elongate arcuate opening therein spaced from said axis the same distance as said channel means and adapted to be alignable therewith; and means for causing a continuous predetermined amount of rotation of said member at a predetermined time of day whereby food may flow from the channel means through said arcuate opening, comprising a motor drivingly connected to said member and means for connecting said motor to a source of power at said predetermined time of day.

2. Apparatus as claimed in claim 1 wherein said opening is adjustable in its arcuate length.

3. Apparatus as claimed in claim 2 wherein said member comprises a pair of discs each having an arcuate opening therein and being releasably clamped for simultaneous rotation, the superposition, of said arcuate openings defining said opening in said member.

4. Apparatus as claimed in claim 1 wherein said member is mounted for rotation in a single direction thereby defining a leading edge and a trailing edge of said opening, said trailing edge including structure for cutting said food.

5. Apparatus as claimed in claim 4 wherein said structure comprises a plurality of teeth.

6. Apparatus as claimed in claim 1 including a cleaning device in contact with said member and fixed with respect to said member.

7. Apparatus as claimed in claim 6 wherein said cleaning device comprises a brush.

8. Apparatus as claimed in claim 1 further comprising a reservoir for holding water, a conduit communicating with said reservoir and having an outlet at a location adjacent said channel outlet, and valve means in said conduit intermediate said reservoir and said conduit outlet interconnected with said means for rotating said member to permit the flow of water therethrough at said predetermined time of day.

9. Apparatus as claimed in claim 1 further comprising an electrical outlet and means for supplying a voltage to said outlet at said predetermined time of day.

* * * * *